(12) United States Patent
Mak (10) Patent No.: US 7,522,075 B2
(45) Date of Patent: Apr. 21, 2009

(54) ENCODING AND DECODING ALPHANUMERIC DATA

(75) Inventor: Michael Man Ho Mak, Milsons Point (AU)

(73) Assignee: bCode Pty Ltd., Milson Point, New South Wales ( * ) Notice: Subject to any disclaimer, the term of this patent is extended or adjusted under 35 U.S.C. 154(b) by 209 days.

(21) Appl. No.: 10/591,694

(22) PCT Filed: Mar. 1, 2005

(86) PCT No.: PCT/AU2005/000276

§ 371 (c)(1),
(2), (4) Date: Sep. 1, 2006

(87) PCT Pub. No.: WO2005/083640

PCT Pub. Date: Sep. 9, 2005

(65) Prior Publication Data

US 2008/0191909 A1  Aug. 14, 2008

(30) Foreign Application Priority Data

Mar. 1, 2004  (AU)  ............................ 2004901046

(51) Int. Cl.
*H03M 7/00* (2006.01)

(52) U.S. Cl. .............................. 341/90; 341/50; 341/51
(58) Field of Classification Search .................. 341/90, 341/50, 51
See application file for complete search history.

(56) References Cited

U.S. PATENT DOCUMENTS

2001/0008564 A1 *  7/2001  Hirao et al. .................. 382/253

* cited by examiner

*Primary Examiner*—Jean B Jeanglaude
(74) *Attorney, Agent, or Firm*—Jones Day (57) ABSTRACT

Information, such as ticket information is encoded, for transmission of the encoded information to a device that can display the encoded information as visible alphanumeric characters. Original information is converted into a binary format then separated into x bit binary words, where x is the same as a maximum number of bits data required by every data character in a pre-determined data character map. The binary words are formed into a sequence of characters using a data character map. Special marker characters are inserted into the sequence. The special characters demarcate the sequence into sets of characters separated by one or more special marker characters. Line feed command characters are also inserted. The encoded information is transmitted to a client device that displays it as a rectangular array of characters bounded by the special marker characters.

7 Claims, 12 Drawing Sheets

Original Ticket Code:
123456789012345 — Converted into Binary Format (57 bits)

30

111000001001000100001100000110111011111101111001

31

Apply bit-based redundancy such as Reed Solomon (120 bits)

32

1101010110000101110000010010001000011000001101110111110111100101000100001100000110111011111101111001

Mapped into character information using character map

33

| Character Map | | |
|---|---|---|
| Ordinal | Binary Ordinal | Character |
| 0 | 00000 | < |
| 1 | 00001 | A |
| ...... | | |
| 26 | 11010 | "4" |
| 27 | 11011 | "5" |
| 28 | 11100 | "6" |
| 29 | 11101 | "7" |
| ..... | | |

34

1101010110
0000101110

33

4Y...
AO..

38

Marker characters and commentary are added to complete final N-Code sequence

35

Start N-Code
==4YJ5=E5CG==
==AOPT=3LKV==
==XEVN=5OS4==
Admission Ticket

| Required 20-digit Data | Temporary Mapped 12-Digit Data |
|---|---|
| 12345678901234567000 | 111222333000 |
| 12345678901234567001 | 111222333001 |
| 12345678901234567002 | 111222333002 |
| 12345678901234567003 | 111222333003 |
| 98765432109876543000 | 111222333004 |
| 98765432109876543001 | 111222333005 |
| 98765432109876543002 | 111222333006 |
| 98765432109876543003 | 111222333007 |
| ... | ... |

| Mapping Table with Resell and Re-issue Requirement | | | |
|---|---|---|---|
| Required 20-digit Data | Temporary Mapped 12-Digit Data | Active (Y/N?) | Timestamp |
| 12345678901234567000 | 111222333000 | Y | |
| 12345678901234567001 | 111222333001 | Y | |
| 12345678901234567002 | 111222333002 | Y | |
| 12345678901234567003 | 111222333003 | Y | |
| 98765432109876543000 | 111222333004 | Y | |
| 98765432109876543001 | 111222333005 | Y | |
| 98765432109876543002 | 111222333006 | N | 2004-10-12 12:34 |
| 98765432109876543002 | 111222333156 | N | 2004-10-14 10:34 |
| 98765432109876543002 | 111222333773 | Y | 2004-10-14 10:34 |
| 98765432109876543003 | 111222333007 | Y | |
| ... | ... | | |

ENCODING AND DECODING ALPHANUMERIC DATA

CROSS REFERENCE TO RELATED APPLICATION

This application is the National Phase application of International Application No. WO 2005/083640, filed Mar. 1, 2005, which designates the United States and was published in English. This application, in its entirety, is incorporated herein by reference.

FIELD OF THE INVENTION

The invention pertains to software and method for encoding alphanumeric information, particularly for wireless transmission with client side scanning and decoding.

BACKGROUND OF THE INVENTION

The invention is taught with reference to the transmission of alphanumeric codes to a client device such as a mobile telephone having a visible area adapted to display alphanumeric characters. The invention also teaches encoding, transmission, optical character recognition (OCR) techniques and data recovery techniques that are particularly adapted to read and interpret the alphanumeric codes that are displayed. It will be understood that the client device is not limited to mobile telephones. Similarly the invention is described as being useful in, but not limited to, ticketing applications.

According to estimates, the size of the mobile ticketing industry will reach US$40 billion by year 2009. There is clear market demand for mobile ticketing technology, across a diverse number of industries and applications, including aviation and transport, ticketing providers, sporting stadiums, movie theatre and entertainment venues, retailers, etc. Mobile ticketing will be able to dramatically reduce the cost of ticket fulfillment, and the cost of queues. As of September 2004, there are more than 1.7 billion mobile devices deployed globally. The amount of paper-based and plastic-based tickets, coupons and cards issued per annum are in the hundreds of billions.

There have been attempts by technology providers to deploy mobile ticketing solutions. Known solutions deploy a methodology of encoding information into a barcode graphic to be transmitted to a mobile device. Common barcode graphics can be either one-dimensional, i.e. the common vertical bars barcode, or two-dimensional. Unfortunately, these solutions are not device or carrier independent. Despite using open-standard protocols by the likes of Enhanced Messaging Service (EMS) and Multimedia Messaging Service (MMS) to send these codes, the fact remains that different client devices simply don't treat the transmitted information equally when interpreting and displaying it.

These inconsistencies in graphical support have caused prior art wireless-borne ticket codes to (a) not arrive at the phones, (b) arrive but not be interpreted, or (c) be interpreted but not scannable. As the mobile devices become more sophisticated, the pixel size of the mobile phone screens decreases, making it practically impossible for a single barcode to be able to be sent to a group of new and old mobile devices and have it displayed consistently and reliably.

There are simpler solutions in the market, whereby information such as a ticket code is transmitted as plain text to the client device. It is then manually read by a person and entered into a keypad. However this process is potentially clumsy, time-consuming, costly, error-prone and not entirely secure.

OBJECTS AND SUMMARY OF THE INVENTION

It is an object of the disclosed technology to address the hurdles above by encoding information into a proprietary developed "N-Code". An N-Code is a series of alphanumeric characters that are specially encoded into a string. The string is easily transmitted, interpreted and optically scanned on the receiving end. Because the displayed message is pure text, the present methods and technology enables all messaging-supporting mobile devices to be used in mobile ticketing and other similar and related applications.

In one embodiment, the disclosed technology achieves end-to-end encoding to decoding by first creating a unique alphanumeric character geometry from an original serial number, ticket or card information, then transmitting it to the mobile device using the protocol adopted by the network, eg. GSM. The displayed alphanumeric code is then scanned using a standard optical capture device, eg. CCD or Firewire cameras. It is captured and processed using a combination of proprietary image processing algorithms and published ones, converting the processed image into alphanumeric guesses via an optical character recognition engine (OCR) before finally applying proprietary decoding algorithms to accurately arrive at the original ticket or card information.

BEST MODE AND OTHER EMBODIMENTS OF THE INVENTION

Figure 1:
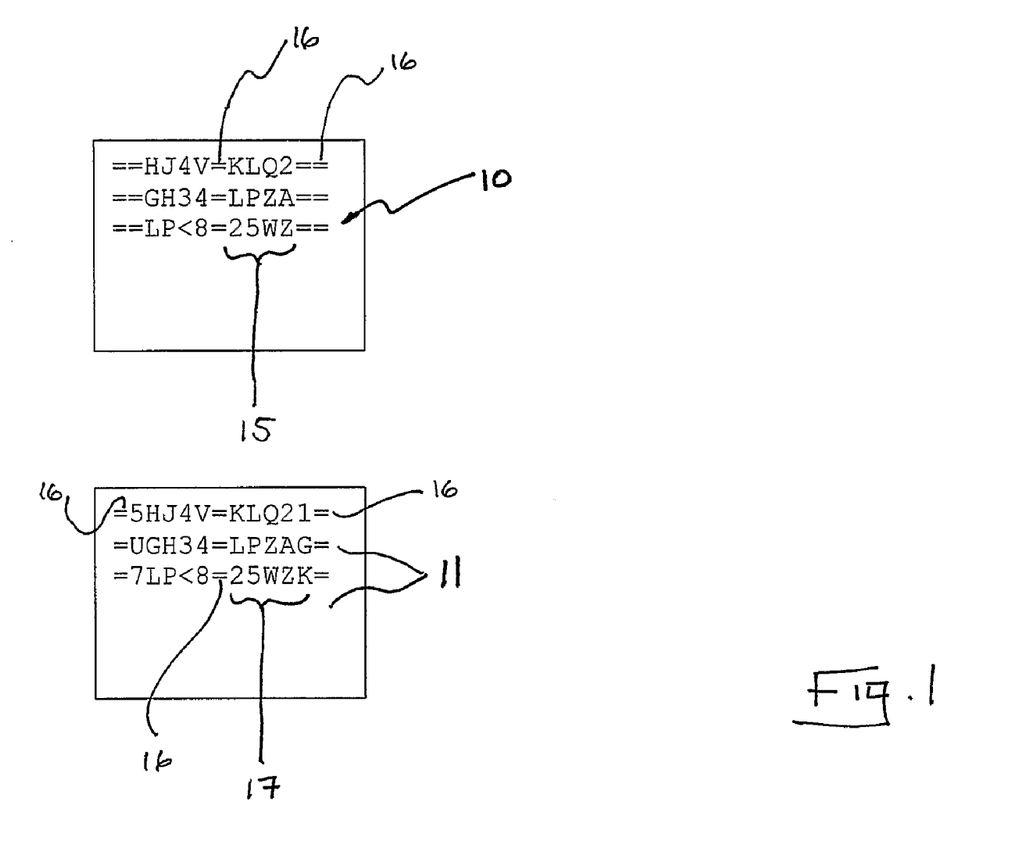
FIG. 1 is a schematic diagram of a client device display illustrating two types of N-code.

As shown in FIG. 1, there is provided a method of encoding information or "initial data" that is otherwise stored in e.g. paper barcodes and magnetic stripes on tickets, cards and passes, into a portable alphanumeric string geometry 10 ("N-Code"). Such an alphanumeric string is easily transmitted wirelessly to all messaging-supporting mobile devices whereupon it may be optically scanned and reliably decoded back to the original encoded information, for purposes such as admission, identification of person, identification of a consumer profile, etc. In one example of FIG. 1, nine to fifteen digits of information are transmitted as a message that results in 3 lines of text 10. Each line has two sets 15 of four or five alphanumeric characters, each line bounded by a special marker character 16. The sets are separated by the same special marker characters 16, here the symbol "=". In another example of FIG. 1, 16 to 18 digits of information are transmitted as a message that results in 3 lines of text 11. Each line has two sets 17 of five alphanumeric characters, each line bounded by a special marker character and the sets separated by a distinctive single special marker characters, here the symbol "=". The "=" is considered distinctive because it is least likely to be confused at a visual level with any other character. Alternatively, other similar methods can be used to utilise the geometric uniqueness of certain alphanumeric characters to define recognised forms of N-Codes for efficient optical processing. These include alternating patterns such as alternating between uppercase to lowercase to uppercase on character progression along a line (eg. aBcDmPdYoG), known patterns such as using pre-defined multi-character sequences (eg. b57-z82-p45-), and location-sensitive character mapping where the characters used for mapping is a function of each character's own x and y coordinates in rows and columns. As an example to the location-sensitive character mapping, one mapping rule could be that third row characters should only contain uppercase letters between M and Z (eg. Line1=29183902, Line2=addcedpqz, Line3=MNPZZQRM). These similar methods are all designed to create geometric patterns in the raw captured image of the N-Code that the decoding system can use as hints to locate the code and decode the image. This unique method of applying alphanumeric geometry is a key contributor to create a system of encoding and decoding alphanumeric data with satisfactory scan reliability and speed for commercial deployment.

Figure 2:
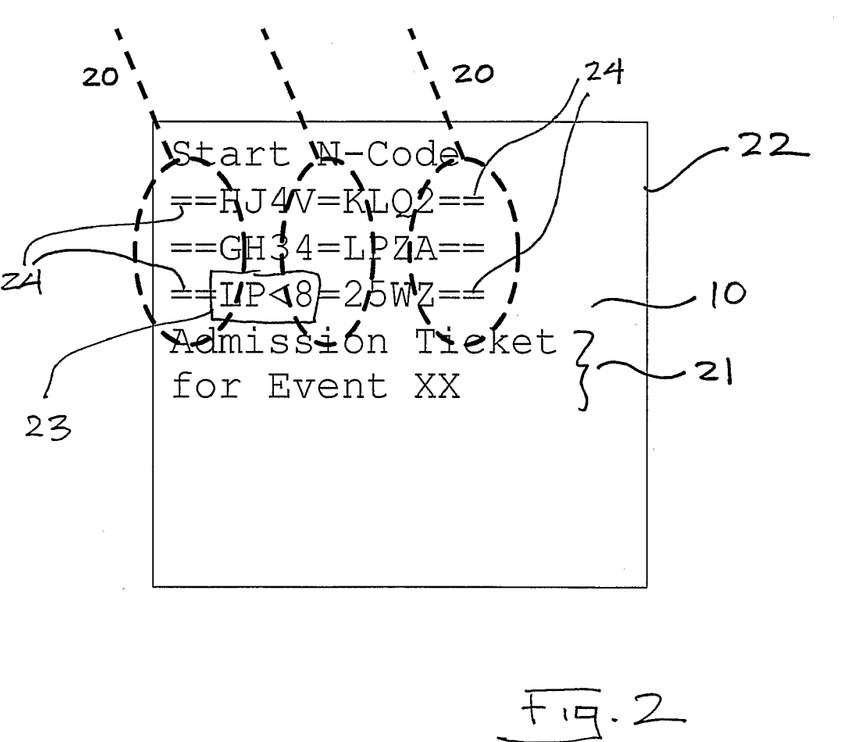
FIG. 2 is a schematic diagram of a client device display illustrating a type of N-Code.

As shown in FIG. 2, a client display 22 shows transmitted special characters 20 in the encoding character set that are easily recognisable to act as markers in the rectangular display geometry so that the image capture and processing algorithms can more efficiently recognise and decode the image. In this example, the alphanumeric character "=" 20 is used as a boundary symbol. Sets 23 of four other characters such as alphanumeric characters are located between separated boundary characters 20. The displayed message may include non-coding descriptive text 21 located outside of the target area defined by the 4 corner located special characters 24.

Figure 3:
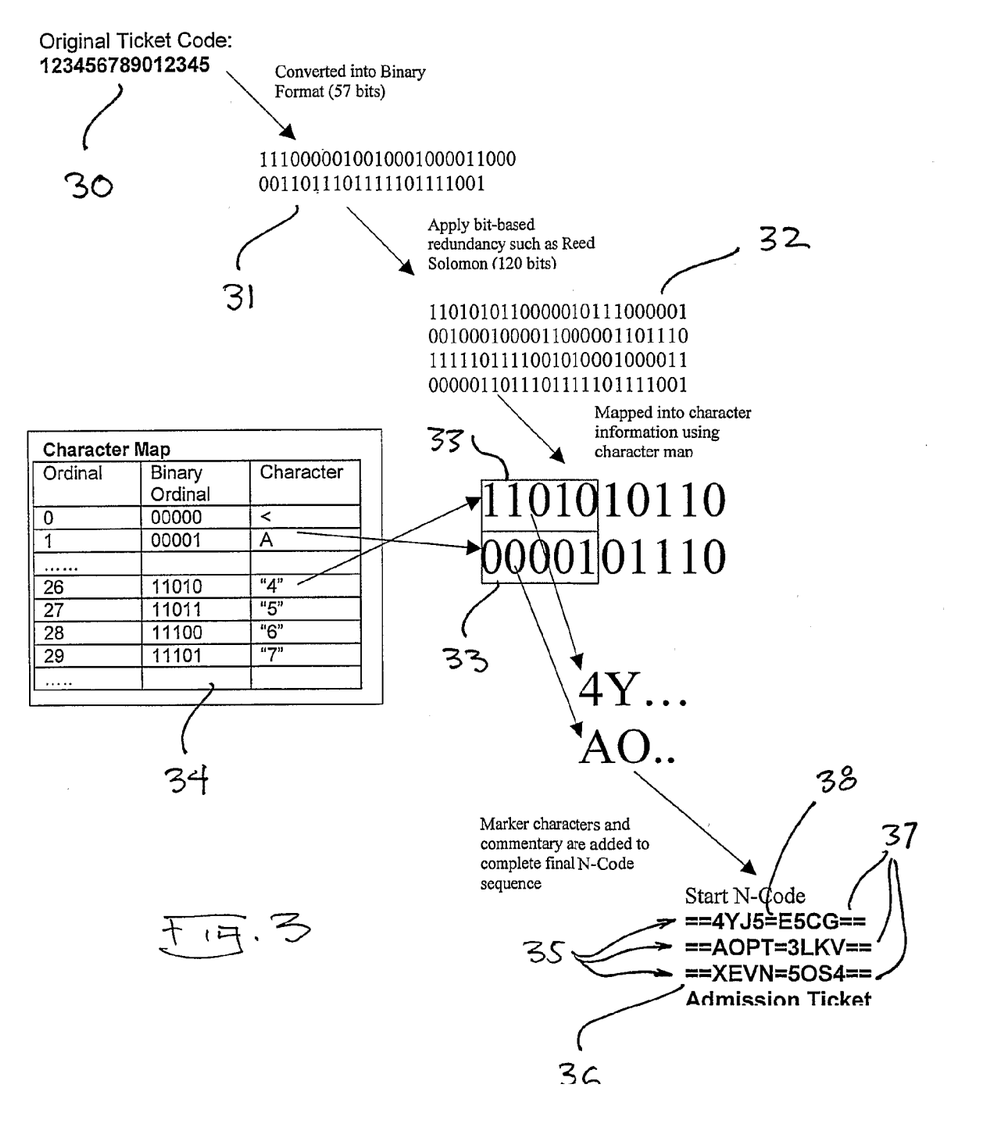
FIG. 3 is a flow chart illustrating the assembly of N-Code from an original number.

As shown in FIG. 3, the method requires that information in the form of an original n-digit ticket code 30 be converted into binary format 31 using published bit-based redundancy algorithm. A suitable algorithm is Reed Solomon, but this is not mandatory. For instance, a ticket code of 123456789012345 will be converted into binary: 00000100100010000110000011011101111101111001, which is now a 47-bit binary number. As the original number has 15 digits, it will be converted into an N-Code formation as illustrated in FIG. 2.

One typical N-Code contains 24 5-bit data characters. In this example, the N-Code can carry a total of 24×5=120 bits of information. The 47-bit binary number is converted into a 120-bit number 32 using Reed Solomon bit-based data redundancy. This number will is then separated into 24 sequential lots 33 of 5 bits, and each 5 bits will now form a 5-bit binary word, and each of these words is mapped into a 5-bit data character from a character map 34. Note that the number of binary bits in each word does not exceed the number of bits required for any character in the map 34.

The following 5-bit character map is a suitable character map for 5-bit characters (there are 2 to the power of 5, which equals 32, characters in this map):
<A B C D E F G H J K L M N O P Q S T U V W X Y Z 2 3 4 5 6 7 9

Note that the alphanumeric characters I, R, 0, 1, and 8 have been removed because they bear resemblance to other characters, potentially causing errors in scanning and decoding. Note that neither 5-bit nor the particular character set above are mandatory to the invention, they are examples. Thus, a 5-bit word that is of value 01010 will map to the 11$^{th}$ character in the set (01010=decimal ten). Allowing for "0" to be the first character, 01010 will map to the 11$^{th}$, which would be "K". In this example all alphabetic characters are upper case.

Using this method, a 120-bit string would be encoded into something that looks like:
6WJ5E5CG<5PT3LKVXEVN5OS4

This raw character sequence is divided into three lines of characters 35 and each line is demarcated by an initial double equals sign "==" 36 and a terminal double equals sign "==" 37. Each line is divided in half by a single equals sign "=" 38. Line feed command characters are inserted as required to provide the final display geometry. Thus, and as suggested by FIGS. 1 and 2, the resultant N-Code will look like:
==6WJ5=E5CG==
==<5PT=3LKV==
==XEVN=5OS4==

This N-Code is now ready to be transmitted. Note that any descriptive text before and after the N-Code will eventually be ignored by the data capture software due to the use of the boundary symbols "=". In the following example, the first and last lines "Start N-Code" and "Admission Ticket" will eventually be ignored by the client side decoding procedure.

Start N-Code
==6WJ5=E5CG==
==<5PT=3LKV==
==XEVN=5OS4==

Admission Ticket

The above type N-Code is transmittable wirelessly onto mobile devices, via network-specific protocols such as SMPP, SS7 or SMTP over air. This utilises existing network infrastructure of network carriers. As it is in plain text, the content will arrive unaltered, and will display highly consistently across different mobile devices, as it is designed for human eye to read. Certain mobile devices display double line-feeds as single and certain other devices display them as doubles. Double line-feeds must be eliminated before sending, to ensure the image is single line-spaced. Double line-spaced N-Codes are not scannable.

Once received by a client device and displayed, the N-Code is captured using an image capture device such as a digital camera or a video camera. The device preferably provides a lighting source that emulates the lighting of a "cloudy day" which is essentially diffused lighting, in order to minimise lighting highlights or "spots" on the capture image of the client device (phone or PDA etc.) screen that would have resulted from direct lighting sources. These lighting spots may obscure part of the image.

The frame rate and data capture speed must be sufficiently fast to transmit colour images of the mobile phone screen. Optionally the capture equipment has a motion detect subroutine that triggers the capture device to take a static "photo" of the stationary mobile phone screen, once it is determined that the mobile phone has indeed become stationary, or within acceptable range of movement that satisfies the definition of stationary. Without this option, software will be used instead to determine from the live video feed whether the phone has arrived and become stationary. This type of image processing software library is widely published and easily obtained and implemented.

The present methods apply statistical and mathematical algorithms to convert the captured colour image of various types mobile phone screen available in the market into a black and white image that a generic optical character recognition engine (OCR) can easily decode into text guesses.

Figure 4:
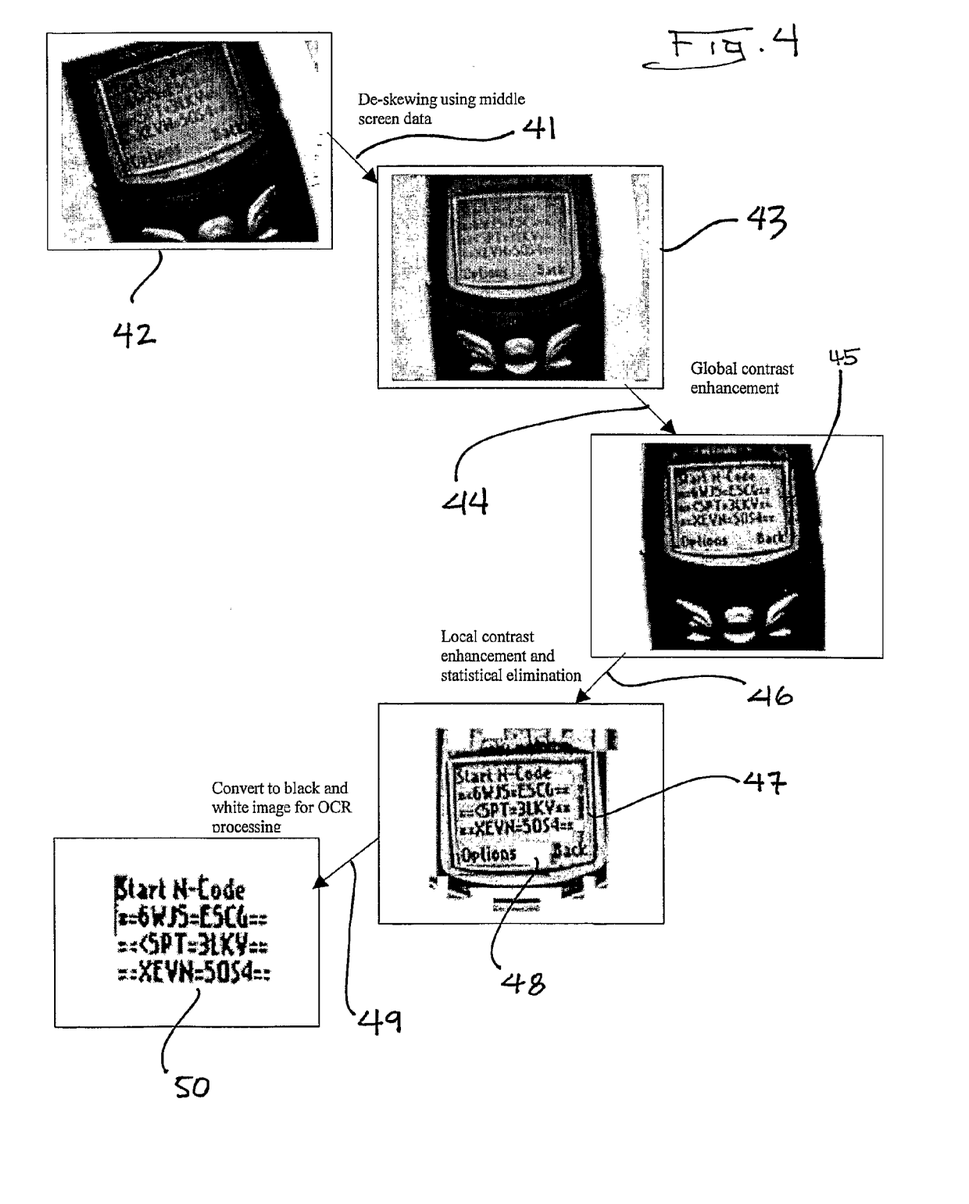
FIG. 4 is a flow chart showing how an image on a client device is prepared for OCR processing.

As shown in FIG. 4, the present methods use one or more of the following sub-methods to achieve the desired result.

De-skewing 41 is performed from skew-data collected from the central 50% of the image. 50% is not the only value that works, and adjacent values will work, but it was found to be suitable. This step allows for small fluctuations of skew by the person not putting the phone down straight. Thus a skewed image 42 of a display is rectified 43. Global contrast processing 44 ensures that the image 45 contains the maximum global contrast. If the grey-scale histogram (obtained by temporarily converting the image to grey-scale, and charting frequency of a grey scale on the (y) axis versus the actual grey scale value on the (x) axis) does not span the entire length of the (x) axis, one applies contrast stretch until it does. Another optional image enhancement technique is local contrast processing 46. This breaks up the entire image 47 into localised regions 48. A suitable break-up size for a 1280×960 pixel image is 50×50 pixel squares, although other similar region sizes are also found to be suitable. The sizes of these regions are less important compared to the localised processing within the regions.

This is done by sampling all the regions and determining the statistical standard deviation of the colour values within each region, and appending them to a table of values. For the pixel sizes above, there will be 520 standard deviation values from the 520 regions. These values are then sorted into a descending order, with highest standard deviation top (which is representative of the local contrast with each 50×50 square) and lowest bottom. Then for the bottom $45^{th}$ percentile (bottom 45% of squares in contrast), one "wipes" them with colour white. This $45^{th}$ percentile value is neither set nor absolute, but is has been found to be suitable. Adjacent values will also return similar results. It is found that the region with the operative N-Code will almost always fall within the top $55^{th}$ percentile in contrast due to the difference in colour between the text characters and the background of the phone screen.

For the remaining higher $55^{th}$ percentile, within each localised region, the method performs a colour-specific contrast stretch, preferably however performed separately for the 3 colour channels, Red, Green and Blue. This gives the regions where the N-Code text is found a significant contrast enhancement. If the sampled data of 520 standard deviations shows a material separation of values that are normal distribution, versus bi-modal distributions, this can be optionally used to further delete unwanted parts of the image by only keeping the bi-modal regions. The result is converted into a high-contrast black and white image 50 using standard colour to black and white contrast stretch. The image 50 is now ready to be passed onto the OCR engine for processing.

Figure 5:
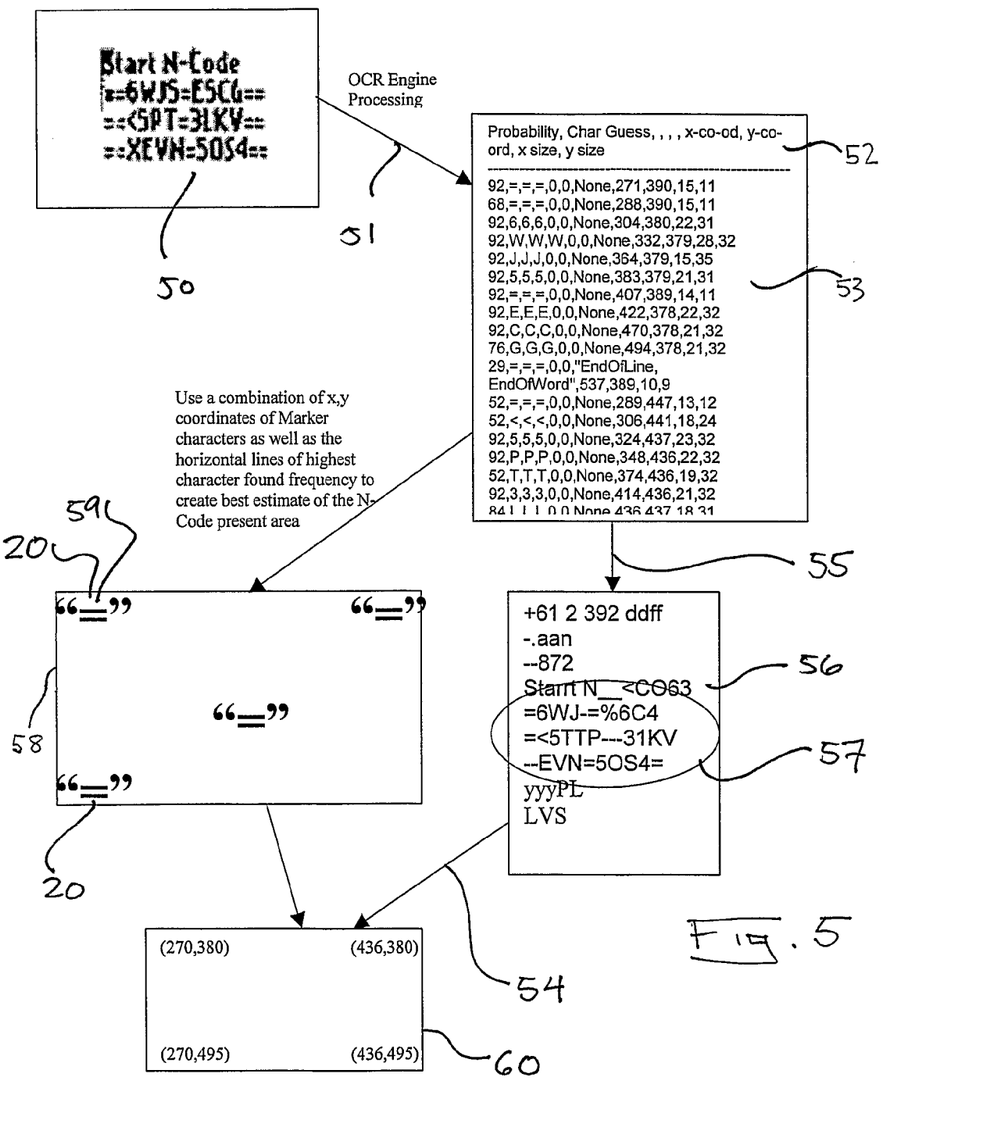
FIG. 5 is a flow chart showing how the output of the OCR process is used to make a best guess as to the N-Code.

As shown in FIG. 5, the method applies a generic optical character recognition engine 51 to the black and white resultant image 50 to arrive at "text guess" statistics 52. The statistics comprise for each guessed character, a degree of confidence, a character guess, x and y coordinates, x and y sizes and other data as may be required. This may be stored in memory as a table of statistics 53.

The methods use the text guess statistics as input to one or more proprietary "code-location" algorithms 55 to make a best guess 56 at the underlying N-Code 57. Any of the following sub-methods may be used. One sub-method eliminates invalid characters, i.e. characters not a part of the character map, from the OCR recognised character tables, so that the OCR algorithm is only able to identify valid coded characters and not spend time processing invalid characters. This helps optimise accuracy and performance of the OCR engine. From the output of guessed characters 53 probabilities and coordinates, one locates the boundary marker characters 20 first. In this example as in previous ones, the marker character would be the equal sign "=". Once found within the results set 53, one applies the following sub-methods to find the most likely rectangular area 58 on where the N-Code resides.

A first sub-method uses the minimum x and y coordinates values from all the equal signs, adjusted by the x and y sizes of the equal signs, to determine the top-left hand corner 59 of the best-estimate N-Code location. A second sub-method uses the maximum x and y coordinates values from all the equal signs, adjusted by the x and y sizes of the equal signs, to determine the bottom-right hand corner of the best-estimate N-Code location. A third second sub-method uses the per-row frequency of valid N-Code character map characters to determine the most likely 3 lines of text that consists of the N-Code. Using a combination of the immediately above first, second and third sub-methods one can determine the most likely N-Code location by x and y coordinates, including but not limited to method such as using the third sub method to determine whether the first and second have returned an error marker character that is not within a fitted rectangular area.

Figure 6:
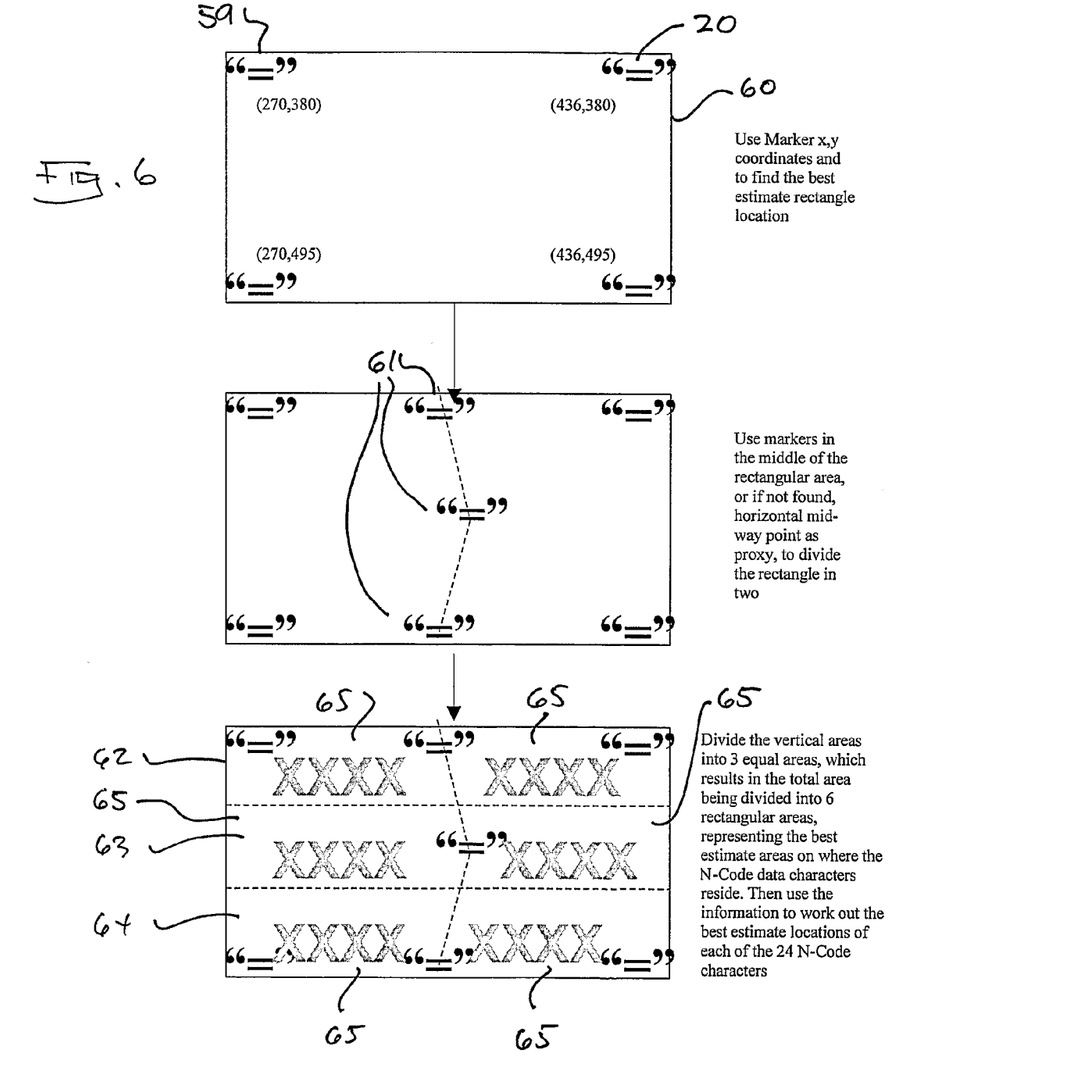
FIG. 6 is a flowchart showing how the coordinates for actual characters are derived.

As shown in FIG. 6, the rectangular target area 60 is determined using the "=" markers as explained above. The method then uses the marker characters 61 that are located in the middle of the code, as well as an equal size 3-way vertical split 62, 63, 64, to cut the rectangular area into 6 sub-sections 65. If the middle markers are absent, one may use the middle of the rectangle 60 as a best estimate.

Figure 7:
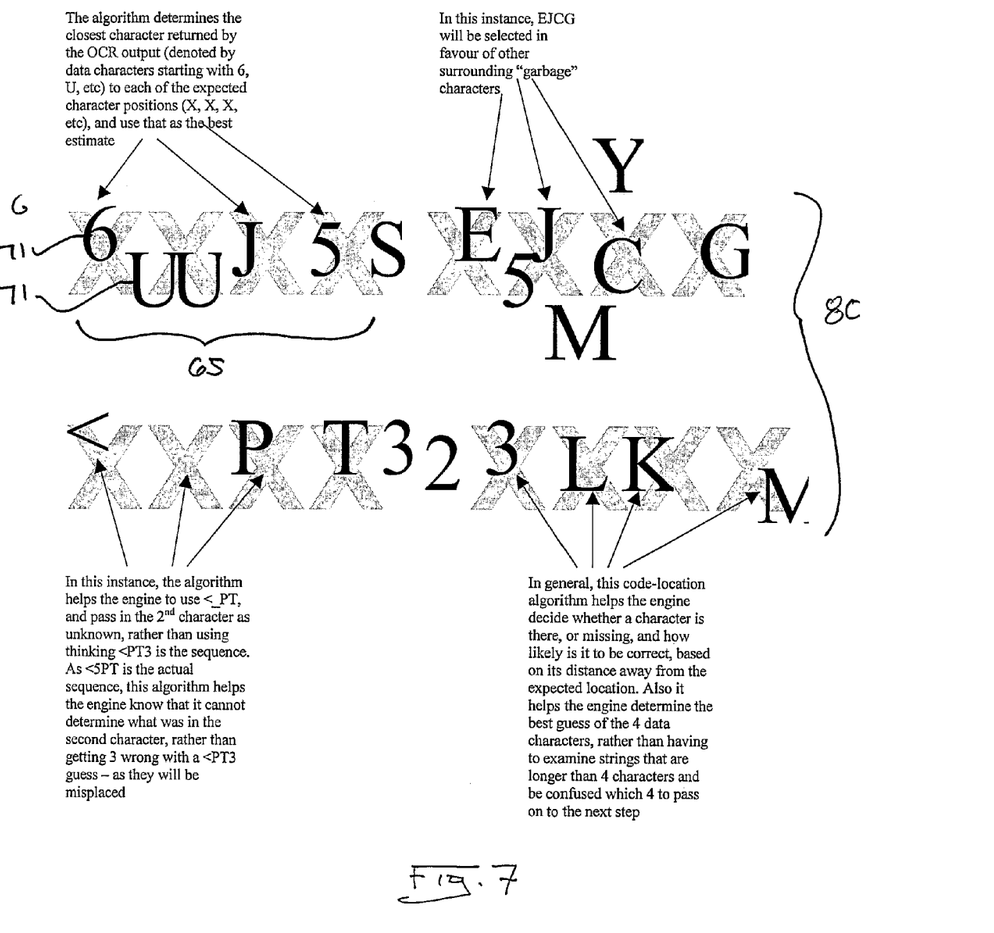
FIG. 7 is a schematic diagram illustrating the best estimate coordinates for each character is used to arrive at data character values.

As shown in FIG. 7, the method then subdivides each of the 6 rectangles 65 to arrive at a map of best estimate coordinates (shown as "X") for each of the expected N-Code characters. The next step is to apply the OCR output data, which contains all guesses made by the OCR engine, to these best estimate coordinates ("X") to arrive at the closest matches 71, having regard for distance between guess characters and our best estimate x, y coordinates for each of the characters (See FIGS. 5 and 6). These closest matches will be used for final decoding.

Figure 8:
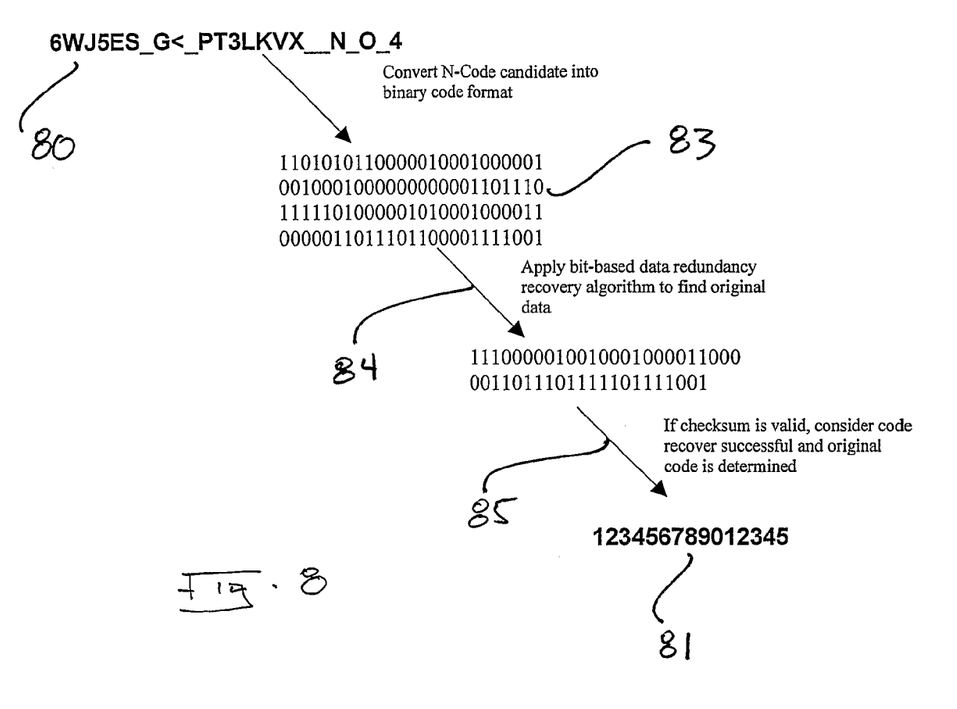
FIG. 8 is a flow chart showing N-code decoding.

As seen in FIG. 7, if the algorithm is not comfortable that there is indeed an accurate enough guess for a character, it will use a blank character (denoted in FIG. 8 as the underscore "_" character). This is determined by a distance and probability threshold. A blank guess means a "known error" and requires less correction and will therefore assist with overall decoding process.

As shown in FIG. 8, the exemplary method presented here turns the best guess 80 into a binary code format 83 then applies bit-based data correction and recovery 84 to the binary version of the best candidate N-Code guess string 80 to determine original code 81, upon satisfying the checksum requirement 85 for code to ensure the final guess as to the original code 81 is a valid code. Should the result 81 fails the checksum test, then the method will attempt to use mathematical algorithms to resample the image at a different sampling resolutions and retry the processing, without having to take another image capture. For example, if the original image is sampled and captured at 400 dots per inch, use mathematical algorithms to resample at say 500 dots per inch, and re-apply above methods. This is very likely to return a correct code 81 with a correct checksum.

If this fails again, rather than resampling, the scanning apparatus returns an error audio or video signal to the user scanning the phone, which will lead to another manual scan attempt. Statistically it is extremely unlikely that this will fail again, as there are often fluctuations in lighting and positioning enough to return a positive scan and decode.

Figure 9:
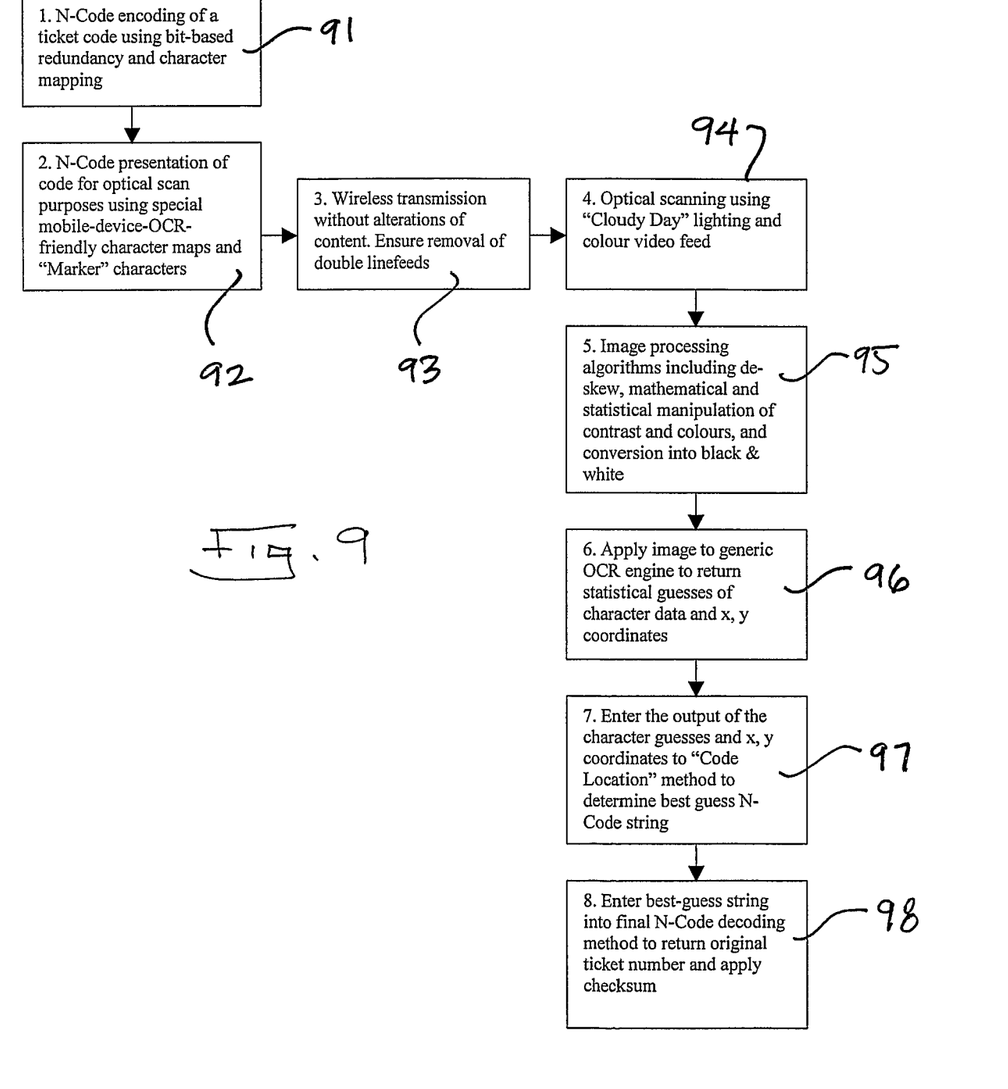
FIG. 9 is a flow chart showing an overview of the N-Code process.

The flow chart of FIG. 9 depicts an overview of the entire methodology discussed above. In summary an "N-Code is derived from a ticket code, identification number or other original information using bit-based redundancy in character mapping. The N-Code is presented for transmission 92 by using a particularly OCR friendly character map and special marker characters. The N-Code is transmitted, preferably wirelessly 93 without alterations to its content. In preferred embodiments, double line feeds are removed. The N-Code is received by a client device that displays it in a way that it can be optically scanned 94. Special lighting may be required. The displayed image is imaged processed 95 using corrective algorithms with may include de-skewing, mathematical and statistical manipulation of contrasts and colors as well as conversion into a final black and white image. The black and white image is operated on by an OCR engine 96 to return a best statistical guess of character data, character location and other statistical information of value. The output of the OCR engine is then operated on by a code location method (including various sub-methods) 97 to determine a best guess N-Code string. Corrective algorithms 98 are applied to turn the best-guess string into the final N-Code thus resulting in a reproduction of the original number or data. Checks on algorithms are preferably applied to guarantee the integrity of the result.

In addition the present technology provides a method of providing a backup identification and authentication of the N-Code using a paper-printed version of the N-Code, should a mobile device fails to scan. In the event of a failed scan, where the image captured from the phone is unreadable by the scanner, but still readable by a human operator, the owner of the mobile device can bring the phone to a manned counter. For example, this could be a result of a damaged phone screen. The personnel at the manned counter can use a keypad to type in the visible portions of the N-Code, and appropriate software will reproduce the N-Code and output a paper-printed version of the N-Code. The owner of the mobile device can then use the newly paper-printed version instead and has it scanned as if it were the display of a mobile phone.

In the event of a totally failed scan, where the image captured from the phone is unreadable by the scanner, and unreadable by a human operator, the owner of the mobile device can attend a manned counter with identification of him/herself. The owner can simply announce his/her mobile phone number, and provide personal identification, so that the system can retrieve the N-Code that was sent to the defunct mobile device using the mobile phone number, and have a paper version printed similar to section a) above, without the personnel actually having to read the phone-borne code.

Figure 10:
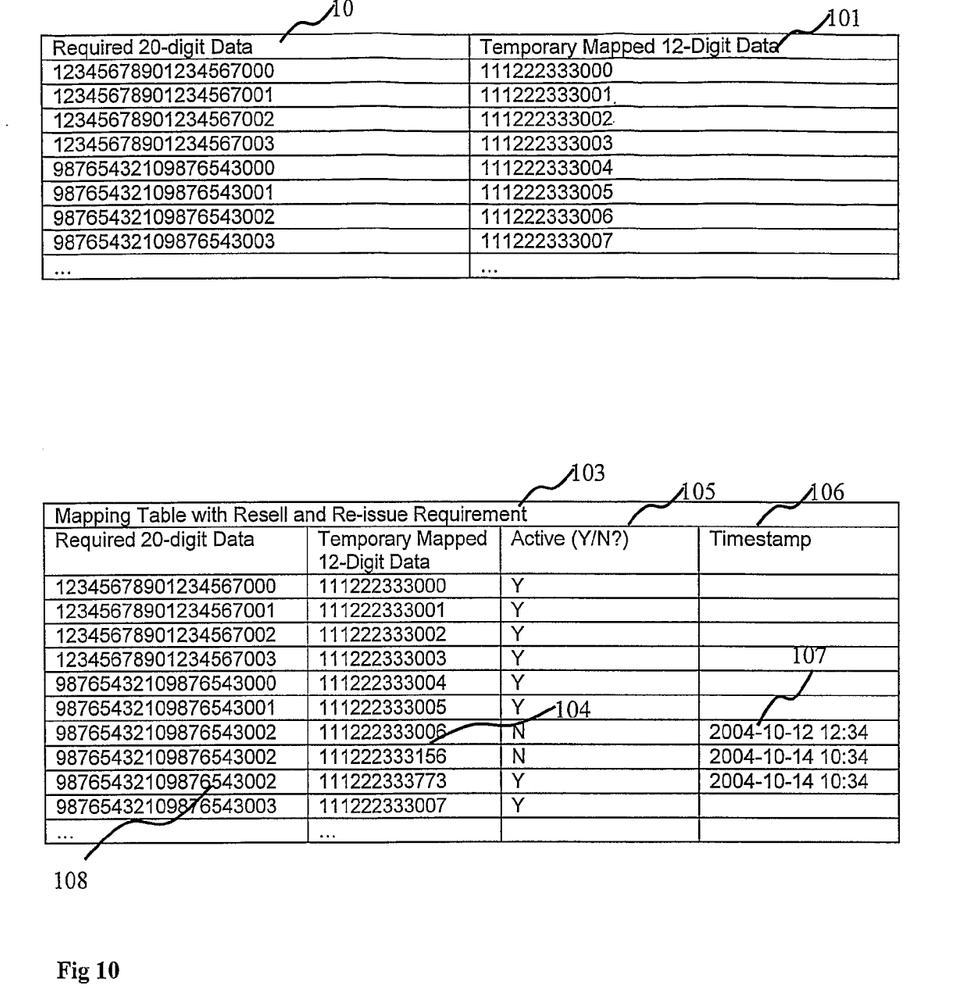
FIG. 10 illustrated mapping between smaller and larger data sizes.

As shown in FIG. 10, some embodiments, the methods associated with the present technology can support data sizes that are larger than what the N-Code can normally contain (where the "data size" is the length or number of digits of ticket data that needs to be encoded). For example, in a particular implementation, the N-Code can encode 12 numeric digits of data 101 but the requirement for the ticket code is for 20 numeric digits 102. In some instances, for example, there may be a time "window", say 4 weeks leading up to a sporting event and not every single 20-digit permutation is required. The solution requires a (e.g. real-time) mapping of 12-digit data 101 into 20-digit data 102 on the server side, effectively satisfying the requirement.

Once the effective time period expires, the 12-digit data can then be effectively discarded and thus be reused again for mapping for other time periods. This continual renewing of the 12-digit data pool allows the smaller data-size numbers to continually be mapped to larger data sets.

In the event where transfers of tickets are required to be performed, tracked and audited, a more sophisticated mapping table 103 is required. When an owner of a ticket wishes to transfer a valid ticket to somebody else, a code mapping mechanism is required to deactivate the original owner's ticket once it is transferred away, and for a new valid ticket to be issued to the new owner that the original owner does not have access to. This process is done by issue of a new valid ticket code 104 to the new owner simultaneously to the deactivation of the original ticket code with active status flag 105. The time of the transfer is logged in a timestamp field 106. If a ticket is being transferred multiple times, this process is repeated, with the times of transfer recorded in timestamp field 106, and sample values outlined in data records 107, to allow for a full audit trail of transfer. Optionally this mapping table could contain person, personal ID and payment details to provide a comprehensive mobile ticket transfer tracking system. This transfer-enabled validation can be implemented in the validation service 1215 in FIG. 12. Meanwhile all of these old and new ticket records are mapped to the same underlying original ticket code 108 from the original ticket issue provider.

Figure 11:
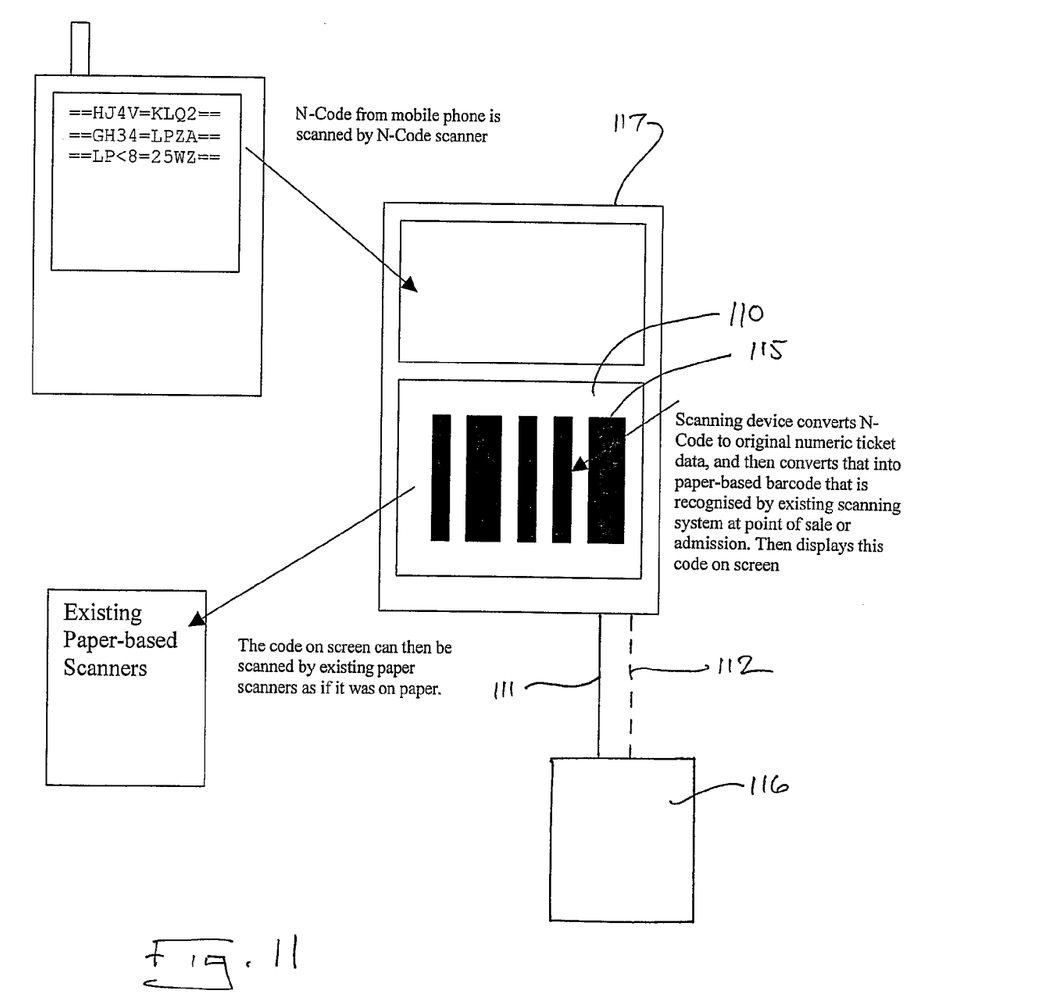
FIG. 11 illustrates a scanner having barcode display, remote display and print features.

As shown in FIG. 11, a further embodiment provides for integration of N-Code scanning and identification into existing paper-based scanning systems without any software or hardware integration, by converting a client-displayed N-Code into a visibly displayed bar code 115 that looks like a paper-based barcode, but is displayed on an auxiliary screen 110 attached to the N-Code scanning device. The auxiliary display screen can be physically separated 116 from and functionally connected to the N-Code scanner 117 by a flexible cord 111 or wireless connection 112. In this way the barcode on the screen can be effectively scanned by existing paper-based scanners. This allows existing scanning systems at point of sale or point of admission to be able to recognise the N-Code without any physical integration between the systems. If the secondary display screen is a touch-screen, the touch-screen layer will need to be removed to eliminate any excess refraction that may cause certain scanners to not recognise the barcode displayed on the screen.

The method of establishing the N-Code data format to be a standard for ticket and card number encoding for mobile devices to provide compatibility with all other modes of transmission, including but not limited to Internet, Wireless Internet, MMS, 3G, GPRS, WiFi, WiMax, Bluetooth, NFC (Near Field Communication) technology and RFID (Radio Frequency Identification), in addition to the SMPP protocol, which is for SMS (Short Message Service). Short Message Service is currently the most prevalent network transport for the transmission of the N-Code data format, however as different networking technologies gain prevalence, the scanning device can be continually upgraded to support different types of transmission technologies, but retaining the N-Code data format to provide consistency across industry, forwards and backwards compatibility.

For transmission technologies, such as Internet, 3G, GPRS, Wi-Fi, WiMax and Bluetooth, the N-Code data format is simply transmitted over those network transport, similar to how it is transmitted over SMPP. For example the N-Code string can be sent via email over a 3G network, or transmitted as a data packet over Wi-Fi or Bluetooth. The content of the N-Code data format will not be altered by the networking technology, and thus can be scanned from the screen of the receiving device, or printed on paper for scanning.

For field detect technologies such as NFC and RFID, where the client side device contains an identification tag that the scanning device can wirelessly recognise, the ID of the device is then mapped to a ticket or card number on the server side, and the N-Code data format is also used to store the ticket information on the identification tag, or to store the ticket and card information on the server side, or to identify the ticket information within the user interface of mobile device itself. This provides a continuity of user experience between the SMPP-borne N-Code tickets and NFC-borne or RFID-borne tickets.

In client side devices that will support it, a user can benefit by creating an electronic or graphical "folder" structure (hierarchical file structure using graphical symbols) that can be used to store N-Code mobile tickets and card information in a separate area for easy retrieval and management by the mobile device user. For example, the user can graphically or otherwise select "My SMS Messages" to read normal messages, and select "My Mobile Tickets" for only find tickets. This also means that the Mobile Tickets are easily found and not easily accidentally deleted. Similarly separate folders or sub-folders can be created for different types of ticketing folder. For example, "Secure Tickets" and "Non-Secure" tickets or "Reusable Tickets & Cards" or "One-time tickets" can each be stored in a separate folder.

Any of the disclosed methods can be implemented together with a PIN-code security access for certain types of tickets or folders. For example, certain tickets or mobile-borne cards might need to be secured. In order to open that folder or ticket, a user-created PIN code will need to be entered on the phone. This PIN is recognised, or not, and acted on accordingly by software on the user's device. This will prevent anyone from accessing those secure tickets or cards even if he/she has gained illegitimate access to the mobile device.

In some embodiments, the transmission and thus the display of the mobile ticket may contain the originating phone number, originating name of contact, content of the message such this information is not within the N-Code section. This provides an easier way for the mobile device's user to find the relevant ticket for scanning.

In particular embodiments, a client side device such as a mobile phone will automatically detect an incoming N-Code ticket to the phone. By analysing the content of the message, the mobile device can recognise the N-Code ticket and therefore treat it differently than a message that has no N-Code. For example, rather than informing the user "New Message", it can alert "New Ticket Received", and either automatically or by prompt of the user, save the ticket in the Ticket folder structure described above. In addition, this prompting can allow the user to decide where to place the ticket, whether it should be placed in a "Once-off ticket folder", a "Reusable ticket folder", or in a "Secure Ticket Folder" etc. Similarly, deleted tickets may be treated differently to deleted plain messages, allowing for easy undelete and deletion reversal. These features can all be implemented in a "ticket wallet" client side software component 1210 within the overall mobile ticketing service detailed in FIG. 12.

If required, the technology uses the non N-Code portion of the ticket message for value-added purposes. A normal length SMS message is 160 characters long, which means that besides the N-Code, depending on which N-Code format, there may be on the order of 125 characters left for other content to be sent to the mobile device. For example the message containing the N-Code can contain a help message such as: "Please retain this message, and present at admission. If lost, SMS 04111-NCODE". It may contain a branding message from the provider such as "X BRAND Cinema N-Code ticket". It may contain third-party advertising such as: "Why not grab a X BRAND Ice Tea on your way to the theatre?". Optionally, the mobile ticketing service can gather very specific consumer behaviour information that can be utilised to deliver targeted advertising on the message that is useful to the consumer and paid for by advertisers. As another option, the ticket may be delivered as or with MMS (Multimedia Messaging Service) content so as to contain attached audio or video information that provides a richer advertisement experience for the mobile device user.

In some examples of the technology wireless and or conventional networking may be established between the centralised server and the deployed N-Code scanners, so that the centralised server can remotely update the software on the scanner for periodic upgrades and diagnosis. For example, the scanners may be configured to send back images that they cannot decode, or they could be set up to periodically look for software or firmware upgrades. Scanners may also be set up to perform automatic reboot or self-recovery, to minimise support required.

Figure 12:
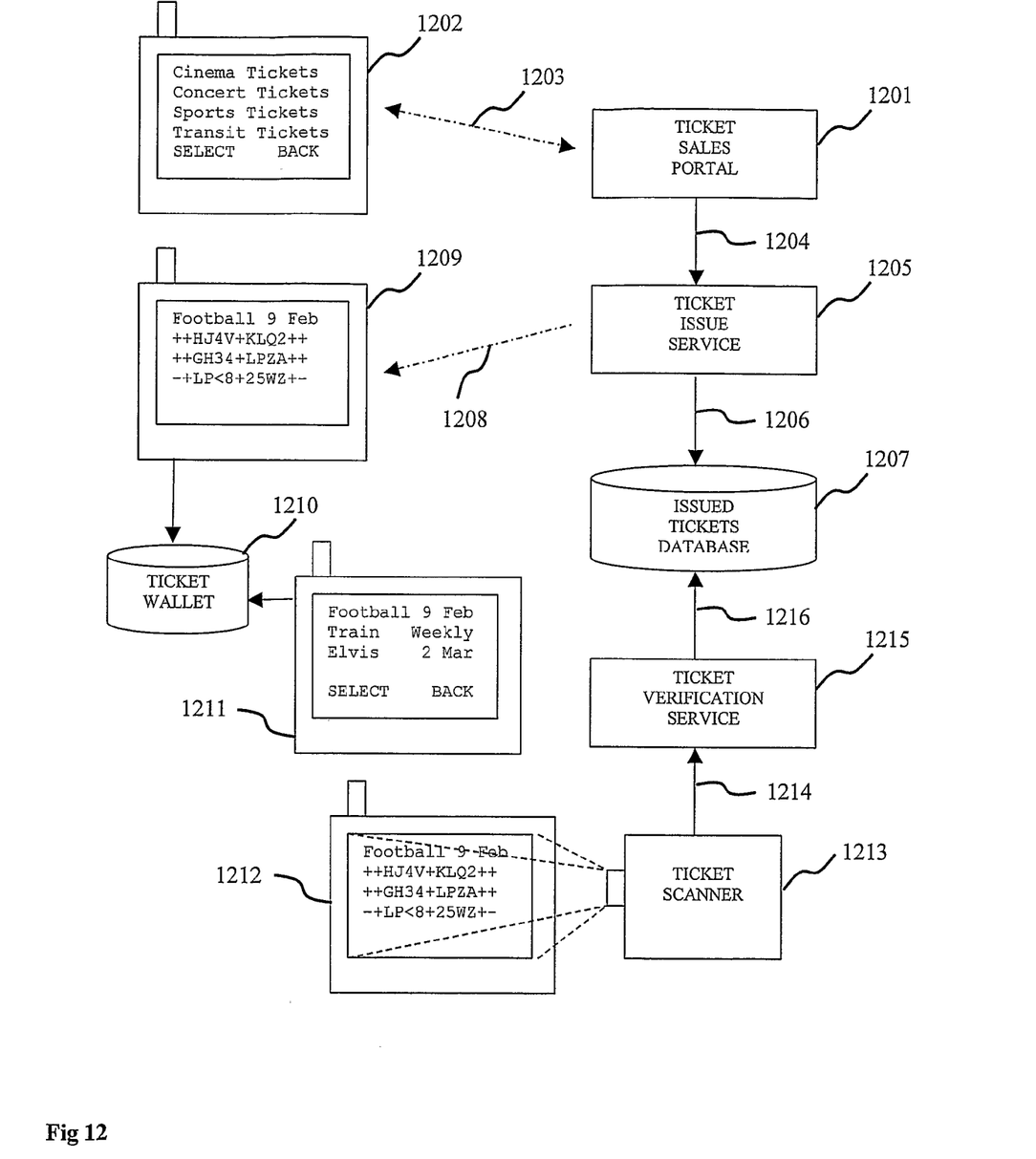
FIG. 12 illustrates structure and control flow of an end-to-end mobile ticketing service

As shown in FIG. 12, a further embodiment provides an end-to-end N-Code mobile ticketing service. The service is able to provide ticketing for all mobile devices, such as mobile telephone handsets, personal digital assistants (PDAs) and pagers, which possess the text display means and preferably software components to apply the N-Code encoding and decoding procedures described above. The following paragraphs describe, with reference to FIG. 12, the components of the system and their interactions in a preferred temporal control flow order. The ticket sales portal 1201 is a WAP or Internet web portal which offers end-customers the means to choose from a range of N-Code tickets offered for sale. As indicated in the figure (screen of mobile device 1202), the tickets are categorized, and the end-customer navigates the category hierarchy to select a desired N-Code ticket. The end-customer is offered billing options, including direct billing as part of a mobile network operator bill or credit card payment. The ticket portal is constructed as a J2EE server application that employs available payment clearing services. In the case that the portal is operated by a mobile telecommunications operator, the end-customer identity for billing may be acquired by lookup of a mapping of device address to end-customer subscriber identity.

A WAP capable mobile telephone handset 1202 is used by a consumer to accesses the ticket sales portal 1201 WAP service. Alternatively the consumer may access the ticket sales portal 1201 Internet service by means of a personal computer or other HTTP protocol capable appliance. Alternatively the consumer may present himself at a physical point of sale, such as a cinema box office or travel agent office, where a sales assistant accesses the ticket sales portal on the consumer's behalf. This service can be integrated with ticket issue database 1207 and transfer-enabled mobile ticketing mapping 103 to deliver ticket sales from the secondary market, i.e. second-hand ticket sales.

The WAP protocol 1203 over a cellular transmission bearer, such as GPRS or W-CDMA, is employed by the consumer's mobile handset 1202 to access the ticket sales portal 1201. Alternatively HTTP or other service delivery protocol may be employed over a wire-line or wireless bearer and communications network.

A request to issue 1204 an N-Code ticket is transmitted by the portal 1201 to a ticket issue service 1205. This request is a SOAP/XML web service request transmitted securely using TLS with TCP/IP over a wire-line network. Alternative protocols, such as CORBA or other RPC protocol may be employed over other bearer and network infrastructure. The request contains the identity of the party operating the portal 1201, the ticket identification required to generate an N-Code ticket, a text identifier of the ticketed service and the time point or period over which the ticket is valid for entry to the ticketed venue.

The ticket issue service 1205 verifies the authenticity of the request 1204 and the current contractual and financial status of the party operating the sales portal 1201. If the transaction verifies, an N-Code ticket is issued to the end-customer by generating an N-Code string from the request 1204 by the N-Code encoding method described above.

A record of the issued N-Code ticket 1206 is entered in a database 1207 of valid issued N-Code tickets.

The issued tickets database 1207 is a relational database containing a table with attributes for sales agent identity, end-customer identity and mobile phone number, ticketed event, issue date and issue status. The issue status indicates issue pending, issue completed, re-issue requested, re-issue completed, cancellation requested, verification completed, resale requested, resale completed. The ticket resale status enables the consumer to offer the ticket for resale via private sale or internet auction sites, such as the E-Bay service. The processes for ticket re-issue, cancellation and resale can be readily implemented by a person skilled in the art. The deactivation of sold ticket and activation of a bought ticket at the validation server 1215 from a ticket code mapping code is detailed in a previous embodiment and outlined by mapping table 103.

The N-Code ticket 1208 is transmitted to the mobile device 1209. This mobile device 1209 is typically the same device as the telephone 1202. The N-Code ticket is transmitted as an SMS/GSM short message. Alternatively other messaging and mail protocols, such as EMS, Nokia SmartMessaging, MMS or POP3, and other wireless bearers, such as 1x-RTT/CDMA, W-CDMA, Wi-Fi, Bluetooth, or even optical bearers such as IrDA or wire-line bearers, such as USB, or proprietary protocols for special devices such as Blackberry wireless email, may be employed to transmit the ticket.

An SMS capable mobile telephone handset 1209 receives the SMS message containing the encoded N-Code ticket. Preferably the mobile handset contains a ticket wallet 1210, where the ticket is stored, having been recognized as an N-Code ticket by the initial "Start N-Code" string. Alternatively other formatting features of the string, such as the placement of the "=" markers, may be used to identify the message as an N-Code ticket. A mobile telephone handset that does not implement a ticket wallet will typically store the message in a built-in SMS inbox or other similar message store.

The ticket wallet 1210 is a component of the mobile device 1209. The ticket wallet stores the N-Code tickets, indexed by ticketed event type and time point or period of fulfillment. The ticket wallet provides a user interface which enables the end-customer to browse the stored tickets by presenting a ticket menu ordered by event type or time of fulfillment. Preferably the wallet presents the tickets in increasing temporal order, so that the next ticketed event that the end-customer will attend is displayed at the top of the list for convenient access for presentation to the ticket scanner 1213. The ticket wallet is implemented as a Java MIDP application executing on the mobile device 1209, but other implementation platforms, such as BREW or Symbian/C++, may be used. The ticket wallet also enables the end-customer to cancel, delete or offer for resale a selected ticket. These functions are performed by the ticket wallet transmitting the requested action, by cellular wireless GPRS or other bearer, to the ticket issue service 1205 for execution. These interactions are not illustrated in FIG. 12, in order to avoid over-complexity. A person skilled in the art can readily implement these functions based on the N-Code ticket as key to query and modify the record in the database 1207. The functional features of the ticket wallet are detailed in a previous embodiment as graphical "folder" structures that enable effective management of N-Code tickets on client devices.

Subsequent to receiving an N-Code ticket and prior to seeking entry to the ticketed venue or service the end-customer invokes the user interface 1211 of ticket wallet function 1210 residing on mobile telephone handset 1209 to present a selected ticket, Typically this is the topmost ticket in temporal order. This function causes the ticket to be displayed on the mobile device screen. Alternatively the end-customer is required to select the appropriate N-Code short message from the SMS inbox or similar message store, in the case that the mobile device does not support a ticket wallet.

When the end-customer wishes to gain access to the ticketed venue or service, he positions the mobile device screen 1212 with N-Code ticket showing in front of the ticket scanner within view of the image sensor employed by the ticket scanner 1213. The ticket scanner 1213 face plate provides a graphic illustrating the correct placement of the mobile device.

The ticket scanner 1213 performs the N-Code ticket decode function as detailed earlier in the present disclosure. The ticket scanner provides a user feedback audio tone to indicate that the information on the mobile device 1212 screen has been scanned successfully. The ticket scanner attempts to authorize entry by following the steps 1214-1216 described below. If the ticket is verified successfully, a user feedback audio tone emitted to indicate a successful verification. If the verification process determines that the ticket is not valid, a message indicating the reason for the failure is displayed to the end-customer. Optionally the ticket scanner may indicate an alert or send an alert message to venue supervisory staff.

The ticket scanner 1213 submits a request 1214 to a ticket verification service 1215 in order to verify that the scanned N-Code ticket is valid, before access to the ticketed venue or service is authorized. The verification request is a SOAP/XML web service request transmitted securely using TLS and the TCP/IP protocol. The request is transmitted over a wireless LAN Wi-Fi network link. Alternatively other network protocols, bearers and infrastructure may be employed. In the case that the verification request cannot be made due to network outage or other failure, the ticket scanner may be configured to accept validly formatted N-Code tickets. In this case verification requests are cached by the scanner, and the verification is performed as soon as the failure has been corrected.

The ticket verification service 1215 authenticates the verification request 1214 in order to ensure that it has been transmitted by an authorized ticket scanner 1213. Authentic requests cause a lookup 1216 of the tickets database 1207. In the case that the lookup confirms a valid N-Code ticket has been presented the verification service indicates this in its reply to the scanner 1213. In the case that the lookup determines that the ticket is not valid for entry, a negative indication and code indicating the reason for the failure is provided in the reply to the scanner 1213.

In order to authorize entry to the ticketed venue or service the issued tickets database is queried by 1216 using the SQL query language to ensure that the N-Code ticket is authentic, that its status is not cancelled or resold, and that it has not already been used to gain entry. If the ticket passes these checks, the status of the ticket is updated as verification completed, signifying that the ticket has been used. Additionally a timestamp and ticket scanner identity may be stored to facilitate tracing of entry transactions. Optionally the ticket scanner may also employ its image capture capability to capture other types of image information along with the ticket, such as personal identification documents such as drivers license, photo ID or passport, or additional token information such as a label or barcode from a merchandise, signatures such as ones on a cheque, or use another camera to capture an image of the person requesting entry. This image and other additional information may be transmitted to the verification service 1215 and stored in this database 1216.

In the case that the ticket scanner 1213 determines that the N-Code ticket is valid, it provides a signal 1217 to a turnstile or other entry mechanism to indicate that entry to the ticketed event or service is authorized.

Note that the system illustrated in FIG. 12 employs an alternative framing of the encoded ticket, as depicted on the screen of the mobile device 1209. In this case "+" characters are used to enable more accurate estimation of horizontal character position. The last line of the encoding is marked using a combination of "+" and "−" characters, as illustrated, to enable possible extension of the code. The distinct framing of the last line also enables image pre-processing to determine that the screen was inverted when presented to the scanner, and a simple pixel based vertical image flip is performed prior to optical character recognition.

The system with components 1201 to 1217 detailed in FIG. 12, when implemented with the method detailed in a previous embodiment in this disclose regarding the standardisation of the N-Code data format for mobile ticketing, allows for a practical forward upgrade path to other types of close-range ticket recognition technologies including optical methods such as barcodes, audio, or radio such as RFID and NFC.

While the present invention has been described with reference to particular details, these should be understood as having been provided by way of example and not as limitations to the scope of spirit or the invention.

What is claimed is:

1. A method for encoding information, for transmission of the encoded information to a device that can display the encoded information as visible alphanumeric characters, comprising the steps of:

converting an n-digit information into a binary format;

separating the binary format into x bit binary words, where x is the same as a maximum number of bits data required by every data character in a pre-determined data character map;

converting the x bit binary words into a sequence of characters using the data character map;

inserting special marker characters into the sequence that demarcate the sequence into sets of characters separated by one or more special marker characters;

inserting one or more special marker characters at the beginning and end of the sequence; and inserting line feed command characters into the sequence prior to transmission.

2. The method of claim 1, wherein, x is four or five.

3. The method of claim 1, wherein:

the data character map excludes one or more alphanumeric characters because of the potential for confusion at a visual level with another character.

4. The method of claim 1, wherein:

the special marker character is the symbol=.

5. The method of claim 1, wherein:

the line feed command characters divide the sequence into portions that are visually displayable when received by a user's device, as two or more lines of equal length.

6. The method of claim 5, wherein:

each line initiates and terminates with one or more special marker characters.

7. The method of claim 5, wherein:

each line is subdivided by one or more special marker characters.

* * * * *